(12) United States Patent
Rathjens

(10) Patent No.: US 10,897,847 B2
(45) Date of Patent: Jan. 26, 2021

(54) FORAGE HARVESTER AND METHOD FOR CONVERTING SAME

(71) Applicant: CLAAS Selbstfahrende Erntemaschinen GmbH, Harsewinkel (DE)

(72) Inventor: Jochen Rathjens, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 266 days.

(21) Appl. No.: 16/037,713

(22) Filed: Jul. 17, 2018

(65) Prior Publication Data
US 2019/0059229 A1  Feb. 28, 2019

(30) Foreign Application Priority Data
Aug. 29, 2017 (DE) .................. 10 2017 119 796

(51) Int. Cl.
*A01D 82/00* (2006.01)
*A01D 43/10* (2006.01)
*A01D 43/08* (2006.01)

(52) U.S. Cl.
CPC ........... *A01D 82/00* (2013.01); *A01D 43/107* (2013.01); *A01D 43/08* (2013.01); *A01D 43/081* (2013.01); *A01D 43/10* (2013.01)

(58) Field of Classification Search
CPC ...... A01D 82/00; A01D 43/107; A01D 43/08; A01D 43/081; A01D 43/10; A01D 43/088
See application file for complete search history.

(56) References Cited

U.S. PATENT DOCUMENTS 6,510,679 B2 * 1/2003 Krone .................. A01F 29/10
460/134
7,484,750 B2 * 2/2009 Van Vooren ......... A01D 43/086
280/491.4

(Continued)

FOREIGN PATENT DOCUMENTS

DE           4215696 A1   11/1993
DE      102010002509 A1    9/2011
(Continued)

OTHER PUBLICATIONS

European Search Report for European Patent Application No. 18174908.6-1006 dated Jan. 22, 2019.

*Primary Examiner* — Arpad Fabian-Kovacs
(74) *Attorney, Agent, or Firm* — Lempia Summerfield Katz LLC

(57) ABSTRACT

A forage harvester is configured to chop harvested material and includes at least one conditioning unit for conditioning the chopped harvested material. The conditioning unit may transfer from its active position (in which operatively connected with other working units) to its passive position (in which the conditioning unit is released from the operational connection). In the passive position, the condition unit may be removed from the entirety of the forage harvester. The forage harvester further includes at least two track drives arranged on opposing ends of a front axle of the forage harvester. The forage harvester includes a free cross-section positioned on a removal side of the forage harvester through which the conditioning unit, in its passive position, can be removed laterally from the rest of the forage harvester, as well as removed above the track drive assigned to the removal side.

20 Claims, 3 Drawing Sheets

(56) References Cited

U.S. PATENT DOCUMENTS

| | | | |
|---|---|---|---|
| 7,681,384 B2* | 3/2010 | Scherer | A01D 82/00 56/16.4 B |
| 8,348,001 B2 | 1/2013 | Isfort | |
| 8,353,149 B2* | 1/2013 | Engel | A01D 43/107 56/16.4 A |
| 8,701,376 B2* | 4/2014 | Laumeier | A01D 82/00 56/16.4 A |
| 9,433,149 B2* | 9/2016 | Mixon | A01D 45/10 |
| 2001/0037633 A1* | 11/2001 | Krone | A01D 43/086 56/13.3 |
| 2003/0161687 A1* | 8/2003 | Kirihata | B62D 55/084 405/100 |
| 2012/0167536 A1* | 7/2012 | Schafer | A01D 43/107 56/14.5 |
| 2012/0180446 A1 | 7/2012 | Engel | |
| 2012/0266581 A1* | 10/2012 | Dreer | A01D 43/088 56/16.4 B |
| 2013/0086879 A1 | 4/2013 | Laumeier | |
| 2013/0154345 A1* | 6/2013 | Schulz | B62D 55/10 305/129 |

FOREIGN PATENT DOCUMENTS

| | | |
|---|---|---|
| DE | 102014007113 A1 | 11/2015 |
| EP | 1530894 A1 | 5/2005 |
| EP | 2532222 B1 | 5/2014 |

* cited by examiner

FORAGE HARVESTER AND METHOD FOR CONVERTING SAME

CROSS REFERENCE TO RELATED APPLICATION

This application claims priority under 35 U.S.C. § 119 to German Patent Application No. DE 102017119796.6, filed Aug. 29, 2017, the entire disclosure of which is hereby incorporated herein by reference.

TECHNICAL FIELD

The technical field relates to an agricultural machine. More specifically, the technical field relates to a forage harvester configured to chop harvested material and including a conditioning unit and one or more track drives.

BACKGROUND

A forage harvester (also known as a silage harvester, forager or chopper) is a farm implement that harvests forage plants to make silage. One example of a forage harvester is disclosed in European patent EP 2 532 222 B1, which includes a forage harvester equipped with a conditioning unit.

The conditioning unit is used for harvesting, such as in the context of corn harvesting in order to crush the grains of corn and thereby prepare the harvested material for use. Forage harvesters may thus be used for harvesting corn as well as for other harvesting applications, such as for harvesting grass. In this context, the forage harvester collects the already-cut grass, cuts up the collected grass, and then transfers, using an ejection unit or the like, the cut up collected grass to a transport wagon. Generally, the grass does not need to be conditioned using a conditioning unit. In this regard, the conditioning unit is removed from the forage harvester when the forage harvester is used for harvesting grass.

Moreover, the forage harvester may use different types of conditioning units, with different conditioning unit designs, for different operations to perform on the harvested material. For example, conditioning units may differ in one or more respects, such as in the design of their rollers, and therefore be more or less suitable for different applications. Thus, a respective conditioning unit, installed in the forage harvester, may be exchanged for another conditioning unit depending on the desired application.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
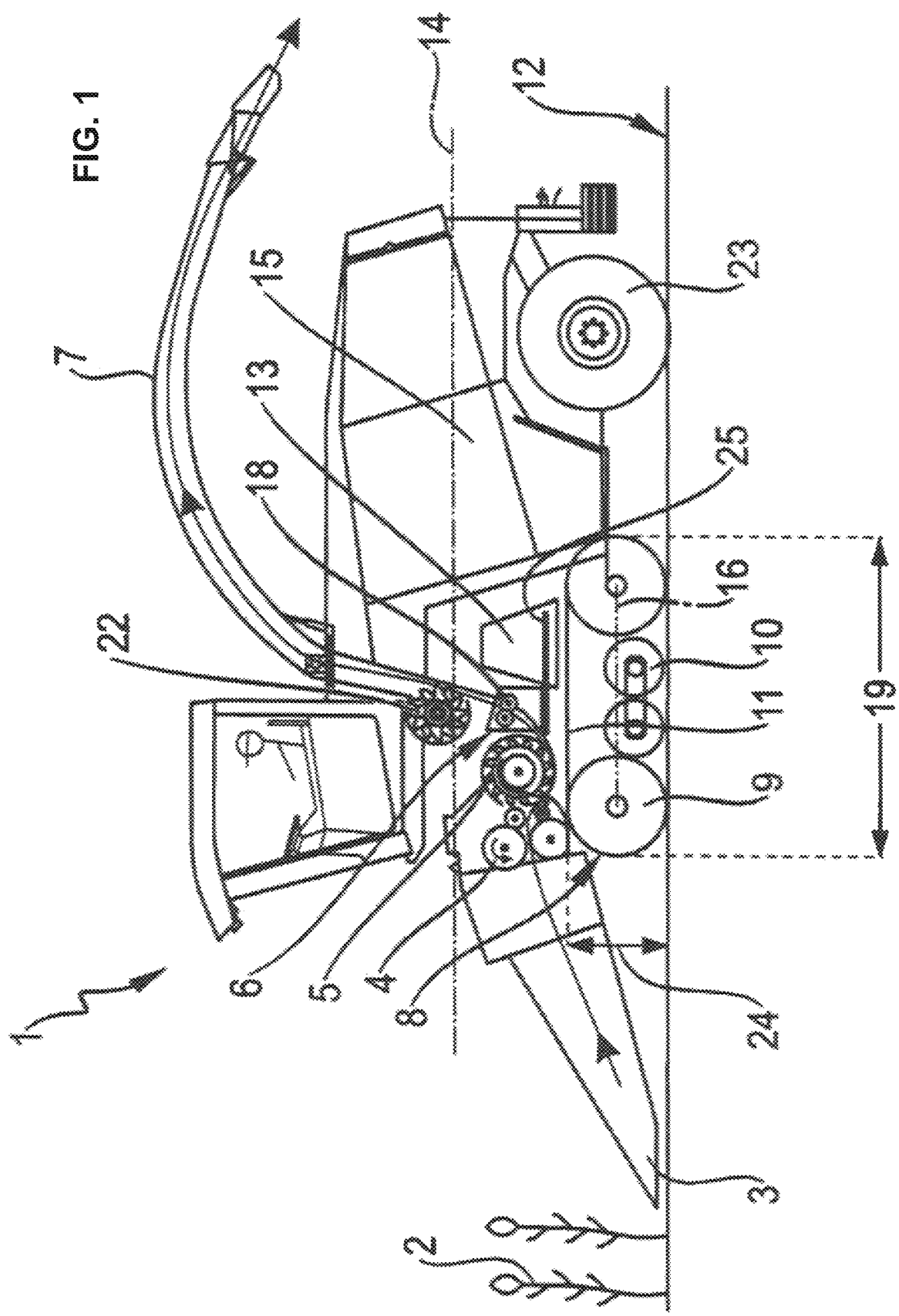
FIG. 1 illustrates a view of a removal side of a forage harvester according to one implementation.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, one or more conditioning units may be removed from and installed in the forage harvester. This process of converting or configuring the forage harvester by removing and/or installing one or more conditioning units is generally referred to as "conversion". The conversion process for the forage harvester is typically difficult since the conditioning unit is difficult to access when present in its active position. In particular, because the conditioning unit is generally located in a longitudinal region of the front tires of the forage harvester (viewed relative to a longitudinal axis of the forage harvester), converting the forage harvester can be difficult. Consequently, in such an arrangement, the conditioning unit may generally only be accessed from the bottom side of the forage harvester.

In one implementation, a forage harvester and a method are disclosed in which conversion of the forage harvester is simplified, specifically enabling more simplified removal of the conditioning unit as opposed to European patent EP 2 532 222 B1.

In one implementation, a forage harvester, configured to chop harvested material, is disclosed. The forage harvester includes at least one conditioning unit configured to condition the chopped harvested material and one or more track drives (such as at least two track drives on a front axle of the forage harvester arranged opposite each other). The conditioning unit conditions (e.g., at least partially crushes) the harvested material. The conditioning unit may have multiple configuration, such as a configuration in an active position (or a position at which the conditioning unit is active) and a configuration in a passive position (or a position at which the conditioning unit is passive). The active position of the conditioning unit may comprise the conditioning unit being operatively connected to one or more other working units of the forage harvester. The passive position of the conditioning unit may comprise the conditioning unit being released from operational connection (e.g., being operatively disconnected from one or more other working units, such as operatively disconnected from all working units of the forage harvester). The position of the conditioning unit may be changed from the active position to the passive position, and vice-versa. For example, the conditioning unit may, beginning from the active position in which the conditioning unit is located in an operational connection with other working units of the forage harvester, be transferred or transitioned into a passive position in which the conditioning unit is released from the operational connection. Further, in one implementation, the conditioning unit may be removed from the rest of (or entirely removed from) the forage harvester when the conditioning unit is in the passive position.

The forage harvester may have one or more track drives, such as at least two track drives, each have two main wheels that are sequential in the longitudinal direction of the forage harvester and opposite each other (e.g., resulting in two opposing main wheels), at least one auxiliary wheel arranged or positioned between the main wheels and at least one belt or track that surrounds or encircles the main wheels.

In one implementation, the forage harvester has a free or unobstructed cross-section that is arranged or positioned on at least one side of the forage harvester, such as on a removal side of the forage harvester. This free or unobstructed cross-section comprises an area (such as a 3-dimensional area or region) that is designed or shaped so that the conditioning unit can be removed laterally, such as along a lateral path, from the forage harvester through the free or unobstructed cross-section (e.g., a region of a lateral free cross-section of the forage harvester) when the conditioning unit is in its passive position. In one implementation, the free or unobstructed cross-section is arranged or positioned above the track drive assigned to the removal side.

A "working unit" comprises a unit of the forage harvester that is configured to process and/or condition the harvested material in any manner. Various working units are contemplated. In addition to the aforementioned conditioning unit, a forage harvester can accordingly also have any one, any combination, or all of: a delivery unit; a chopping unit; an acceleration unit; an ejection unit; or other working units.

The "conditioning unit" serves the purpose of "abrading" or rubbing the corn grains, such as in the context of corn harvesting. This process of abrading may condition the harvested material, such as the corn, in order to use the harvested material as feed or to use as an ingredient for a biogas system, since individual corn grains may be better utilized the finer they are ground. Typically, a conditioning unit has two rollers that can be rotatably driven in opposite directions and are operated at different rotational speeds. The rollers delimit or define a working gap between them through which the cut, initially unconditioned harvested material is guided. The rollers execute a tangential movement relative to each other due to the difference in speed between the rollers or their surfaces in the region of the working gap, which ultimately causes the abrasion or rubbing of the harvest material.

When the conditioning unit is in its active position, the conditioning unit interacts with the other work units such that the harvested material flows through the conditioning unit and can be processed using the conditioning unit. In contrast, when in the passive position, the conditioning unit is not supplied the harvested material. In one implementation, the passive position may be positioned offset from the active position (e.g., the passive position is offset relative to the active position by a certain length relative to a longitudinal axis of the forage harvester viewed in the direction of a rear end of the forage harvester). Alternatively, the passive position may be identical to the active position, when viewed purely in terms of location, so that, in the final analysis, both positions only differ from each other in that the conditioning unit, when present in its active position, is in an operative connection with the other working units, whereas the conditioning unit is disconnected from this operative connection when present in its passive position.

In one implementation, the transition of the conditioning unit between its active position and passive position is associated with a movement of the conditioning unit relative to the rest of the forage harvester. For example, in the passive position, a channel element (such as a rail) may be used to route or guide the flow of the harvested material to the place at which the conditioning unit would have been located in the active position.

As discussed above, in one implementation, one or more "track drives" may be used. In comparison to typical round tires, the "track drives" are transmission elements by which the drive torque from the forage harvester may be transmitted to the ground so that the forage harvester can move relative to the ground. In a specific implementation, the track drives are designed in the form of "flat tracks" in which one or more sides of the track, such as the top section of the track and/or the bottom section of the track, extends at least substantially parallel to the ground. Alternatively, the track drive may circulate on a substantially triangular path.

In one implementation, a "free cross-section" comprises a more-or-less free area that is designed free of components. In this way, the conditioning unit may be guided through it (e.g., guiding into and/or out of the free cross-section). In one implementation, the free cross-section may be designed in the form of a recess in a housing of the forage harvester that may, for example, be closed by means of a flap or door.

In one implementation, the "removal side" of the forage harvester comprises a respective longitudinal side of the forest harvester at which the conditioning unit can be removed, e.g., is arranged at the free cross-section.

In one implementation, the removal and/or installation of the conditioning unit is simplified. For example, the conditioning unit may be removed laterally from the forage harvester, without the need to remove the conditioning unit downward (e.g., with a downward motion) or in the direction of the rear of the forage harvester. The lateral removal through the free cross-section enables using one or more removal devices that may be designed as an extraction tool. Various types of extraction tools are contemplated. For example, such an extraction tool may be guided with the support of a machine, such as a forklift, or the like. This use of the extraction tool makes the removal of the conditioning unit from the forage harvester and/or the reinsertion of the conditioning unit into the forage harvester easy and quicker.

Viewed in the longitudinal direction of the forage harvester, the free cross-section is located within a longitudinal region of the track drive, or the track drive that is assigned to the removal side of the forage harvester. In other words, the free cross-section is designed such that it is located above the respective track drive on the removal side of the forage harvester. As discussed above, in one implementation, the forage harvester is equipped with track drives. The track drives may enable the lateral removal and the installation of the conditioning unit. In comparison to normal round tires, the track drives have a much lower height so that additional room is available above the track drives. The additional room may be used as the free cross-section and hence as part of the conversion process of the forage harvester. In contrast, if the forage harvester were equipped with normal round front tires, the free cross-section may be much smaller.

Correspondingly, in one implementation, the height, measured starting from the ground to vertically of at least the track drive which is positioned on the removal side of the forage harvester, in a first example is a maximum of 100 cm at a highest point of the track drive, in a second example is a maximum of 90 cm, or in a third example, is a maximum of 80 cm. With such a design of the respective track drive, there is considerable leeway to design the free cross-section as disclosed herein.

Furthermore, in one implementation, the main wheels of the track drive have substantially the same diameter so that the track or belt surrounding the main wheels may extend between the main wheels at least substantially parallel to a connecting axle (which includes the hubs of the two main wheels). For example, with regard to a top section of the track or belt, there may be no or minimal deviations in the parallel path resulting from a sag of the track. In this regard, the track may extend at a comparatively low level overall (when viewed relative to the forage harvester or to the ground), with the track requiring little space a vertical direction, thereby freeing up space at the removal side of the forage harvester. Space is accordingly available so that the free cross-section according may be positioned on the removal side.

In one implementation, the track may extend continuously below a lower edge of the conditioning unit located in its passive position, when viewed in a vertical direction. In this implementation, the conditioning unit may be more easily removed laterally from the forage harvester without having to additionally lift the conditioning unit above the respective track drive during removal since the conditioning unit is already located above the track drive. The removal movement of the conditioning unit may accordingly be oriented at least substantially entirely horizontal (e.g., substantially in a same plane).

In one implementation, the conditioning unit may be moved to the rear (in a rearward direction as indicated by the forage harvester) in a direction parallel to a longitudinal axis of the forage harvester to transition from the conditioning unit's active position to the conditioning unit's passive position. In one implementation, this movement to the rear may be performed by using a guide device or the like. The guide device may, for example, comprise one or more rails extending parallel to the longitudinal axis of the forage harvester along which the conditioning unit may be moved, such as, for example, using a chain drive. The movement of the conditioning unit "to the rear" has the particular advantage that the conditioning unit can be initially disconnected from the operational connection with the other working units and then be "free" such that the conditioning unit may be removed from the forage harvester without influencing or affecting other components of the forage harvester.

Furthermore, in one implementation, a method for converting the forage harvester (e.g., removing and/or inserting the condition unit) is disclosed. The method may comprise the following: the conditioning unit is removed from the rest or remainder of the forage harvester at a removal side of the forage harvester in a direction transverse to a longitudinal axis of the forage harvester laterally from the forage harvester, as well as above a track drive assigned to the removal side. The configuration method may be performed easily whereby the conditioning unit may be very easily guided through the free cross-section in the direction transverse to the longitudinal axis of the forage harvester. In this way, the configuration method need not use a complicated removal or installation of the conditioning unit from a bottom side of the forage harvester. Thus, the overall conversion of the forage harvester is shortened and simplified.

Viewed in the longitudinal direction of the forage harvester, the conditioning unit may be removed in the longitudinal direction within a longitudinal region of the track drive assigned to the removal side. This location on the forage harvester is very easily accessible, which in particular is assisted by the use of track drives since, as described above, the track drives have a much lower height in comparison to normal round tires and accordingly leave a free space above their track in the forage harvester which can then be used to convert the forage harvester in the described manner.

Moreover, the conditioning unit may initially be in its active position, and may be moved rearward from its active position in a direction parallel to the longitudinal axis of the forage harvester until it is located in its passive position (such as by sliding the conditioning unit along a rail) before the conditioning unit is ultimately removed laterally from the forage harvester. In one implementation, when the conditioning unit is positioned in its passive position, the conditioning unit is located in a region of the free cross-section (which may comprise a free 3-dimensional space at least laterally) so that the lateral removal of the conditioning unit may be accomplished using an at least substantially exclusively horizontal movement or exclusive movement from the remainder of the forage harvester that is entirely above a top of the track drive.

As noted above, the method may use a removing device in order to remove the conditioning unit from the forage harvester. Specifically, the removing device may initially lift up the conditioning unit from its bearing in its passive position and from contact from the rail, and then may laterally remove the conditioning unit from the forage harvester. In this regard, the conditioning unit may only be lifted to a slight extent in order to release contact of the conditioning unit with a bearing surface on which the conditioning unit lies when present in its passive position so that the conditioning unit is then freely suspended on the removal device. In one implementation, the removal device may be designed in the form of a fork tine of a fork of a forklift, and may, for example, be shaped with an individualized seat or cradle for the conditioning unit. In this context, the removal device may thus be shaped to be connectable to the conditioning unit in a manner that transmits force such that the conditioning unit can be moved using the removal device relative to the forage harvester. In this manner, a respective conditioning unit may be removed from the forage harvester very quickly and also very easily for the user, and conversely may also be reinserted into the forage harvester.

Referring to the figures, FIG. 1 illustrates a view of a removal side of a forage harvester 1 according to one implementation. Specifically, forage harvester 1 is equipped with a cutting unit 3, a conveying unit 4, a chopping unit 5, a conditioning unit 6, an ejection unit 7, and an accelerating unit 22. One, some, or all of these units may form the working units of the shown forage harvester 1 through which harvested material 2 may be processed. Specifically, the harvested material may first be cut by the cutting unit 3, then conveyed, using the conveying unit 4, toward the chopping unit 5 and chopped using the chopping unit. Then, the chopped harvested material 2 is supplied to the conditioning unit 6 arranged downstream from the chopping unit 5. As shown in FIG. 1, conditioning unit 6 includes two rollers 18 that may be rotatably driven in an opposite direction and delimit or define a working gap between them. Using the conditioning unit 6, the chopped harvested material 2 is "worn down" and prepared thereby for subsequent use. Then, the accelerating unit 22 accelerates the chopped and conditioned harvested material 2 and then supplied to the ejection unit 7 through which the harvested material 2 may be ejected out of the forage harvester 1, such as, for example, in the direction of a transport vehicle.

The forage harvester 1 may be equipped on both sides of its front axle with track drives 8. These may each comprise two main wheels 9 arranged sequentially in the longitudinal direction of the forage harvester 1, as well as two auxiliary wheels 10 arranged between the main wheels 9. Each of the track drives 8 moreover may possess a track 11, belt or the like that surrounds the main wheels 9. As illustrated in FIG. 1, the main wheels 9 each have the same diameter so that the track 11 extends between the main wheels 9 parallel to a connecting axle 16 on which the hubs of the two main wheels 9 lie. This design allows for the track drives 8 to be assembled comparatively flat, wherein they have a height 24 as illustrated in FIG. 1 that extends approximately 90 cm starting from a surface 12 of the respective working field. The height 24 indicates the height of the highest point of the track drive 8 that, more or less, forms a top level that is formed by a top section of the track 11 (or belt) due to the substantially horizontal path of the track 11 (or belt) between the main wheels 9. The height level of the track drive 8 may at least be substantially constant over this top level. Since the main wheels 9 of the respective track drive 8 are arranged sequentially, the overall track drive 8 extends over a longitudinal region 19 measured parallel to a longitudinal axis 14 of the forage harvester 1. The forage harvester 1 possesses a rear wheel 23 on its rear axle.

FIG. 1 illustrates a side of the forage harvester 1 that corresponds to a removal side 15 thereof. That is, the conditioning unit 6 may be removed according to the invention laterally from the forage harvester 1 at this removal side 15. For this, the forage harvester 1 includes a free cross-section 13 that in this case is designed in the shape of a trapezoid. Other shapes of the free cross-section 13 are contemplated. The free cross-section 13 is positioned above the track drive 8 assigned to the removal side 15 and is located within the longitudinal region 19 of the track drive 8. Moreover, the free cross-section 13 is positioned such that it is located behind the conditioning unit 6 when present in its active position viewed in the longitudinal direction of the forage harvester 1.

To convert the forage harvester 1, which in this case consists of removing the conditioning unit 6, the conditioning unit 6 may first be moved into its passive position from its active position as illustrated in FIG. 1. For this, the conditioning unit 6 is moved out of its operational connection with the other working units (including any one, any combination, or all of cutting unit 3, conveying unit 4, chopping unit 5, accelerating unit 22, or ejection unit 7) and is moved to the rear in a direction parallel to the longitudinal axis 14 of the forage harvester 1 by means of a rail 25. In one implementation, the conditioning unit 6 has reached its passive position once the conditioning unit has been moved far enough to the rear on the rail 25 (or other type of structure) for it to be located in a region of the free cross-section 13. In this regard, in one implementation, the passive position at least partly overlaps the three-dimensional region of the free cross-section 13 (e.g., the conditioning unit 6 is located in the three-dimensional region of the free cross-section 13 of the forage harvester 1 when present in its passive position). Then, the conditioning unit 6, proceeding from its passive position, may be removed laterally from the forage harvester 1, wherein the conditioning unit 6 is subjected to a movement that is at least substantially oriented exclusively transverse to the longitudinal axis 14 of the forage harvester 1. In other words, the conditioning unit 6 may be removed laterally from the forage harvester 1 above the track drive 8. In this regard, removing the conditioning unit 6 from a bottom side of the forage harvester 1 is thereby unnecessary.

Figure 2:
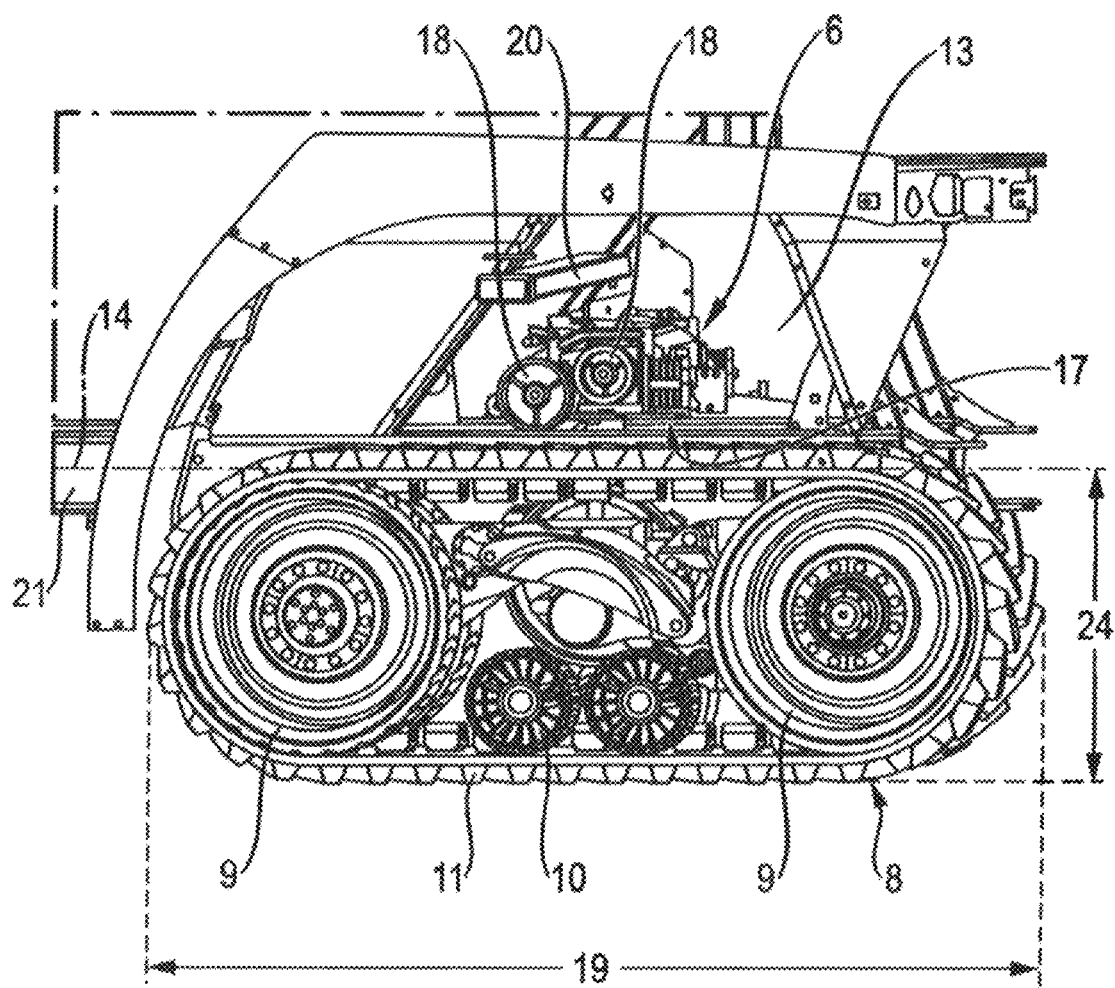
FIG. 2 illustrates a first perspective partial view of a front region of the forage harvester depicted in FIG. 1.
Figure 3:
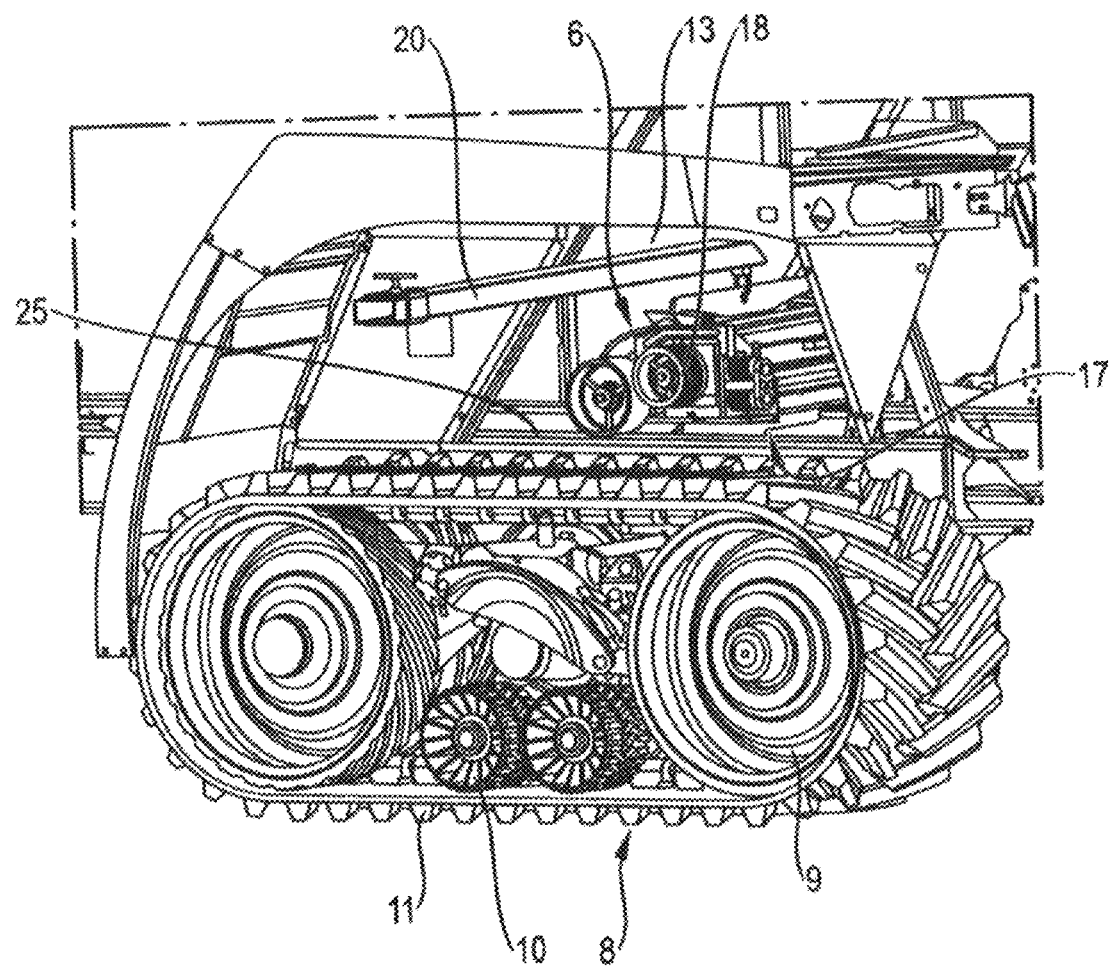
FIG. 3 illustrates a second perspective partial view of a front region of the forage harvester depicted in FIG. 1.

The free cross-section 13 and a removal device 20 (used to remove the conditioning unit 6) are illustrated in FIGS. 2 and 3. FIGS. 2 and 3 moreover illustrate that a bottom edge 17 of the conditioning unit 6 is consistently located above a top point of the track drive 8 assigned to the removal side 15, which allows for the conditioning unit 6 to be removed from the forage harvester 1 using a purely horizontal (or substantially horizontal) movement. A collision with the track drive 8 is of less concern. In the situation shown in FIGS. 2 and 3, the conditioning unit 6 is located in its passive position in which it is moved, relative to its active position, to the rear along a main support 21 of a support frame of the forage harvester 1 in a direction parallel to the longitudinal axis 14 of the forage harvester 1. When present in its passive position, the conditioning unit 6 may be reached by means of a removal device 20, which is configured to grasp at least a part of the conditioning unit (such as the top side of the conditioning unit 6). The removal device 20 may be designed as an accessory for a forklift in the shown examples that is not portrayed in the figures. Starting from its passive position, the conditioning unit 6 may accordingly be lifted out of its bearing and then be removed from the forage harvester 1, through the free cross-section 13 using the removal device 20, in a direction transverse to the longitudinal axis 14 of the forage harvester 1. The conditioning unit 6 may thus only be lifted to the extent that the conditioning unit 6 loses its contact with its bearing surface on which it lies when present in its passive position. Consequently, the removal movement of the conditioning unit 6 starting from its passive position is substantially formed by a purely horizontal (or substantially horizontal) movement.

Similarly, the same or a different conditioning unit 6 may be very easily reinstalled in the forage harvester 1 in the same manner in which it was removed from the latter in the described manner.

REFERENCE NUMBER LIST

1 Forage harvester
2 Harvested material
3 Cutting unit
4 Conveying unit
5 Chopping unit
6 Conditioning unit
7 Ejection unit
8 Track drive
9 Main wheel
10 Auxiliary wheel
11 Track
12 Surface of the working field
13 Free cross-section
14 Longitudinal axis of the forage harvester
15 Removal side of the forage harvester
16 Connecting axle
17 Bottom edge of the conditioning unit
18 Roller
19 Range of extension of the track drive
20 Removal device
21 Main support
22 Accelerating unit
23 Rear wheel
24 Height
25 Rail It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A forage harvester configured to chop harvested material, the forage harvester comprising:
at least one conditioning unit configured to condition the harvested material, the conditioning unit configured in the forage harvester in an active position and a passive position, wherein in the active position, the conditioning unit is operatively connected to at least one working unit, wherein in the passive position, the conditioning unit is not operatively connected to the at least one working unit;

at least two track drives on a front axle of the forage harvester arranged opposite each other, wherein each of the at least two track drives include two wheels that are sequential in a longitudinal direction of the forage harvester and opposite each other and at least one belt that surrounds the two wheels, wherein one of the at least two track drives is positioned on a removal side of the forage harvester; and a free cross-section located on the removal side of the forage harvester, wherein the conditioning unit is at least partly in the free cross-section when in the passive position, wherein for removal of the conditioning unit from the passive position until at least a part of the conditioning unit is located completely outside of the forage harvester, the conditioning unit is subjected to a movement that is substantially oriented exclusively transverse to an axis of the forage harvester starting from the passive position via the free cross-section, the movement for removal being above the one of the at least two track drives positioned on the removal side of the forage harvester.

2. The forage harvester of claim 1, wherein the conditioning unit is configured to at least partially crush the harvested material.

3. The forage harvester of claim 1, wherein the configuration of the conditioning unit is changed from the active position to the passive position by moving the conditioning unit via one or more rails along a longitudinal axis of the forage harvester; and wherein the movement that is substantially oriented exclusively transverse to the axis of the forage harvester comprises:
a lifting movement such that the conditioning unit loses contact with the one or more rails on which the conditioning unit lies when in the passive position; and
after the lifting movement, a removal movement of the conditioning unit that is substantially oriented exclusively transverse to the longitudinal axis of the forage harvester.

4. The forage harvester of claim 1, wherein the free cross-section comprises a recess in a housing of the forage harvester;
wherein the passive position is entirely within the free cross-section; and
further comprising a door configured to close the recess in the housing.

5. The forage harvester of claim 1, wherein the conditioning unit is moved using a guide device to a rear of the forage harvester in a direction parallel to the axis of the forage harvester in order to transition from the active position to the passive position.

6. The forage harvester of claim 1, wherein the one of the at least two track drives positioned on the removal side of the forage harvester includes a belt that extends below a bottom edge; and
wherein the conditioning unit, when positioned in the passive position, is above the bottom edge.

7. The forage harvester of claim 1, wherein the movement for removal of the conditioning unit that is substantially oriented exclusively transverse to the axis of the forage harvester comprises:
a lifting movement such that the conditioning unit loses contact with a surface on which the conditioning unit lies when in the passive position; and
after the lifting movement, a removal movement of the conditioning unit that is oriented exclusively transverse to a longitudinal axis of the forage harvester until the at least a part of the conditioning unit is located completely outside of the forage harvester.

8. The forage harvester of claim 7, further comprising a removal structure connected to the conditioning unit, the removal structure shaped to receive at least a part of a removal device inserted within the removal structure such that for the removal of the conditioning unit, the at least a part of the removal device is inserted within the removal structure in order for the removal device to subject the conditioning unit to the movement that is substantially oriented exclusively transverse to the longitudinal axis of the forage harvester.

9. The forage harvester of claim 8, wherein the conditioning unit moves from the active position to the passive position along the longitudinal axis of the forage harvester.

10. The forage harvester of claim 7, wherein after the lifting movement, the removal movement of the conditioning unit is oriented exclusively transverse to the longitudinal axis of the forage harvester until the conditioning unit in its entirety is located completely outside of the forage harvester.

11. A method for converting a forage harvester, the method comprising:
in the forage harvester comprising at least one conditioning unit configured to at least partly crush harvested material supplied thereto and at least two track drives arranged on opposing ends of a front axle of the forage harvester, each of the at least two track drives comprising two opposing main wheels surrounded by a belt and one of the at least two track drives on a removal side of the forage harvester, a free cross-section located on the removal side of the forage harvester:
configuring the conditioning unit to an active position, wherein, in the active position, the conditioning unit is operationally connected with at least one working unit of the forage harvester;
configuring the conditioning unit into a passive position, wherein, in the passive position, the conditioning unit is released from operational connection with the at least one working unit of the forage harvester; and
moving, starting from the passive position, the conditioning unit relative to a remainder of the forage harvester until at least a part of the conditioning unit is located completely outside of the forage harvester, wherein the movement of the conditioning unit relative to the remainder of the forage harvester is at the removal side of the forage harvester and is substantially oriented exclusively transverse to an axis of the forage harvester starting from the passive position via the free cross-section until the at least a part of the conditioning unit is located completely outside of the forage harvester and above, when viewed in a vertical direction, the one of the at least two track drives on the removal side of the forage harvester.

12. The method of claim 11, wherein the conditioning unit, starting from the active position, is initially moved to a rear of the forage harvester in a direction parallel to longitudinal axis of the forage harvester until the conditioning unit is located in the passive position; and
wherein moving the conditioning unit starting from the passive position relative to the remainder of the forage harvester until the at least a part of the conditioning unit is located completely outside of the forage harvester is substantially oriented exclusively transverse to the longitudinal axis of the forage harvester.

13. The method of claim 12, wherein the passive position is located within a region of a lateral free cross-section of the forage harvester.

14. The method of claim 13, wherein the movement that is substantially oriented exclusively substantially oriented exclusively transverse to the longitudinal axis of the forage harvester comprises:
initially lifting, using a removing device, the conditioning unit vertically from the passive position; and
after initially lifting the conditioning unit vertically, exclusively laterally removing transverse to the longitudinal axis of the forage harvester, using the removing device, the conditioning unit from the remainder of the forage harvester.

15. The method of claim 14, wherein the removing device comprises a forklift and
wherein the configuration of the conditioning unit is changed from the active position to the passive position by sliding the conditioning unit along a rail in order to release the conditioning unit from operational connection with the at least one working unit of the forage harvester; and
wherein the initial lifting of the conditioning unit vertically comprises lifting the conditioning unit to break contact of the conditioning unit from the rail.

16. The method of claim 11, wherein the movement for removal of the conditioning unit that is substantially oriented exclusively transverse to the axis of the forage harvester comprises:
a lifting movement such that the conditioning unit loses contact with a surface on which the conditioning unit lies when in the passive position; and
after the lifting movement, a removal movement of the conditioning unit that is oriented exclusively transverse to a longitudinal axis of the forage harvester until the at least a part of the conditioning unit is located completely outside of the forage harvester.

17. The method of claim 16, wherein the movement for removal of the conditioning unit that is substantially oriented exclusively transverse to the longitudinal axis of the forage harvester is caused by a removal device; and
wherein, after at least a part of a removal device is inserted into a removal structure connected to the conditioning unit, the removal device moves the conditioning unit in the movement that is substantially oriented exclusively transverse to the longitudinal axis of the forage harvester until the conditioning unit is entirely outside of the forage harvester.

18. A forage harvester configured to chop harvested material, the forage harvester comprising:
at least one conditioning unit configured to condition the harvested material, the conditioning unit configured in the forage harvester in an active position and a passive position, wherein in the active position, the conditioning unit is operatively connected to at least one working unit, wherein in the passive position, the conditioning unit is not operatively connected to the at least one working unit;
at least two track drives on a front axle of the forage harvester arranged opposite each other, wherein each of the at least two track drives include two wheels that are sequential in a longitudinal direction of the forage harvester and opposite each other and at least one belt that surrounds the two wheels, wherein one of the at least two track drives is positioned on a removal side of the forage harvester;
a removal structure connected to the conditioning unit, the removal structure shaped to receive at least a part of a removal device inserted within the removal structure; and
a free cross-section located on the removal side of the forage harvester, wherein the conditioning unit is at least partly in the free cross-section when in the passive position,
wherein for removal of the conditioning unit until at least a part of the conditioning unit is located completely outside of the forage harvester, the at least a part of the removal device is inserted within the removal structure in order for the removal device to subject the conditioning unit to a movement, from the passive position until the at least a part of the conditioning unit is located completely outside of the forage harvester, that is substantially exclusively in a single direction, the movement that is substantially in the single direction being above the one of the at least two track drives positioned on the removal side of the forage harvester.

19. The forage harvester of claim 18, wherein the removal structure is shaped to receive a fork of a forklift; and
wherein the at least a part of the removal device is positioned in the direction transverse to an axis of the forage harvester in order to remove the conditioning unit from the forage harvester.

20. The forage harvester of claim 19, further comprising one or more rails along a longitudinal axis of the forage harvester, the one or more rails extending parallel to the longitudinal axis of the forage harvester, the conditioning unit in the active position along a first part of the one or more rails and in the passive position along a second part of the one or more rails; and
wherein the movement that is substantially exclusively in the single direction comprises:
a lifting movement such that the conditioning unit loses contact with the one or more rails on which the conditioning unit lies when in the passive position; and
after the lifting movement, a removal movement of the conditioning unit that is substantially oriented exclusively transverse to the longitudinal axis of the forage harvester until the at least a part of the conditioning unit is located completely outside of the forage harvester.

* * * * *